United States Patent [19]

Welch et al.

[11] Patent Number: 5,035,206
[45] Date of Patent: Jul. 30, 1991

[54] DUAL FUEL NATURAL GAS/DIESEL 2-STROKE ENGINE

[75] Inventors: Alan B. Welch; Raymond C. D. Skinner, both of Toronto; Wendelin A. Goetz, Kitchener, all of Canada

[73] Assignee: Ortech Corporation, Ontario, Canada

[21] Appl. No.: 548,559

[22] Filed: Jul. 5, 1990

[30] Foreign Application Priority Data

Jul. 4, 1989 [GB] United Kingdom ............... 8915352

[51] Int. Cl.⁵ ............................................. F02B 49/00
[52] U.S. Cl. ............................... 123/27 GE; 123/575; 123/525
[58] Field of Search ............... 123/27 GE, 525, 575

[56] References Cited

U.S. PATENT DOCUMENTS

| | | | |
|---|---|---|---|
| 4,091,772 | 5/1978 | Heater et al. | 123/27 G E |
| 4,527,516 | 7/1985 | Foster | 123/27 GE |
| 4,570,605 | 2/1986 | Eberhardt | 123/27 G E |
| 4,677,944 | 7/1987 | Nishimura et al. | 123/27 G E |
| 4,679,538 | 7/1987 | Foster | 123/27 G E |
| 4,754,733 | 7/1988 | Steiger | 123/27 G E |
| 4,846,126 | 7/1989 | Stannard | 123/27 G E |
| 4,865,001 | 9/1989 | Jensen | 123/27 G E |

*Primary Examiner*—E. Rollins Cross
*Attorney, Agent, or Firm*—Shoemaker and Mattare

[57] ABSTRACT

A dual fuel, natural gas/diesel two-stroke engine includes a cylinder and a piston in the cylinder, and inlet ports around the cylinder which are uncovered by downward movement of the piston. A blower forces air through the inlet ports when the latter is uncovered, and the engine includes an exhaust port and valve for exhausting combustion gases once each cycle. Diesel injection takes place near top dead center to ignite the gaseous mixture. An injector is provided for injecting natural gas into the cylinder once each cycle, including a delivery conduit which opens into the cylinder at a location above the inlet ports for air, such that the piston when descending completely uncovers the conduit before beginning to uncover the air inlet ports.

12 Claims, 1 Drawing Sheet

DUAL FUEL NATURAL GAS/DIESEL 2-STROKE ENGINE

This invention relates generally to a novel construction for a 2-stroke engine, and has to do particularly with a modification of a conventional Detroit Diesel 2-stroke diesel engine to enable it to operate on natural gas assisted by diesel pilot ignition.

GENERAL BACKGROUND OF THIS INVENTION

It is well known that 80% to 90% of North American buses utilize a 2-stroke diesel engine of the kind manufactured by Detroit Diesel. However, the level of permitted emissions in North America will become more and more stringent over the next few years, and there is serious concern that many of the 2-stroke diesel engines currently in use will not be able to meet the new standards. The primary difficulties with the standard 2-stroke diesel engines relate to emitted "smoke" (unburned carbon) and $NO_x$.

A significant prior art patent is U.S. Pat. No. 4,527,516, issued July 9, 1985 to Foster. However, this prior patent does not address the optimization of engine operation with respect to low emissions, and does not provide any means for accomplishing such optimization. Furthermore, this prior patent fails to appreciate the importance of cooling the combustion air prior to injection.

GENERAL DESCRIPTION OF THIS INVENTION

It is known that natural gas (largely methane) tends to burn with a very clean combustion (absence of particulate matter), and it is the aim of this invention to provide a modification of a 2-stroke diesel engine to allow it to utilize natural gas as the main fuel, utilizing diesel oil to act mainly as a source of ignition.

Generally, this invention provides a 2-stroke engine having airblowing means for blowing air into the cylinder when the piston is at the bottom dead centre position, means for cooling the combustion air, further means for the timed injection of natural gas into the cylinder when the piston is close to its bottom dead centre position (thereby not requiring high pressure injection), and means for injecting diesel fuel when the piston is near its top dead centre position, to act as a trigger for the ignition and combustion of the natural gas/air mixture.

More particularly, this invention provides, in a dual fuel, natural gas/diesel two-stroke engine having at least one cylinder, a piston in the cylinder, inlet port means around the cylinder to be uncovered by downward movement of the piston in the cylinder, air means for forcing air through said inlet port means when uncovered, an exhaust port and valve means for opening said exhaust port once each cycle to exhaust combustion gases from said cylinder, diesel injection means to inject diesel fuel into the cylinder once each cycle, and gas injection means for injecting natural gas into the cylinder once each cycle, the improvement according to which the gas injection means includes a delivery conduit for natural gas, which conduit opens into the cylinder at a location above said inlet port means, whereby the piston when descending completely uncovers said conduit before beginning to uncover said inlet port means.

Further this invention provides a dual fuel, natural gas/diesel two stroke engine comprising:
at least one cylinder,
a piston in the cylinder,
inlet port means around the cylinder to be uncovered by downward movement of the piston in the cylinder,
air means for forcing air through said inlet port means when uncovered,
an exhaust port and valve means for opening said exhaust port once each cycle to exhaust combustion gases from said cylinder,
diesel injection means to injet diesel fuel into the cylinder once each cycle,
and gas injection means for injecting natural gas into the cylinder once each cycle, said gas injection means including a delivery conduit for natural gas, which conduit opens into the cylinder at a location above said inlet port means, whereby the piston when descending completely uncovers said conduit before beginning to uncover said inlet port means.

Additionally, this invention provides a method of operating a dual fuel, natural gas/diesel two stroke engine, the engine comprising:
at least one cylinder,
a piston in the cylinder,
inlet port means around the cylinder positioned to be uncovered by downward movement of the piston in the cylinder,
air means for forcing air through said inlet port means when uncovered,
an exhaust port and valve means for opening said exhaust port once each cycle to exhaust combustion gases from said cylinder,
diesel injection means to injet diesel fuel into the cylinder once each cycle,
and gas injection means for injecting natural gas into the cylinder once each cycle, said gas injection means including a delivery conduit for natural gas, which conduit opens into the cylinder at a location above said inlet port means, whereby the piston when descending completely uncovers said conduit before beginning to uncover said inlet port means; said method comprising the steps:
a) as the piston approaches top dead center, injecting diesel fuel into the cylinder to initiate combustion of an ignitable gaseous mixture previously placed in the cylinder,
b) as the piston descends on the power stroke, beginning the opening of the exhaust port and initiating exhaust prior to the point where the descending piston uncovers the said conduit.
c) uncovering the conduit due to the further descent of the piston,
d) after the descending piston has uncovered said inlet port means, forcing air into the cylinder,
e) after the descending piston has passed bottom dead centre initiating injection of natural gas into the cylinder,
f) after the ascending piston covers inlet port means, ceasing the forcing of air into the cylinder,
g) closing the exhaust port, as the piston closes the inlet port means,
h) halting the injection of natural gas before the ascending piston covers said conduit, but after the piston has closed said inlet port means,
i) closing the said conduit after halting the injection of natural gas, and
retracing steps a) through i).

GENERAL DESCRIPTION OF THE DRAWINGS

One embodiment of this invention is illustrated in the accompanying drawings, in which:

FIG. 1 is a schematic view of a portion of a 2-stroke engine, arranged to operate in accordance with this invention; and FIG. 2 is a timing diagram indicating events which are controlled by the dual fuel system.

DETAILED DESCRIPTION OF THE DRAWING

It is known that a significant fraction of air utilized in any 2-stroke engine is lost due to scavenging. "Scavenging" is the process by which the forced injection of air, when the piston is close to the bottom dead centre position, forces the combustion products from the most recent firing out through the exhaust valve located in the cylinder head (which is open for the period of time necessary to accomplish this). If the natural gas were simply mixed with the combustion air, and blown into the cylinder to scavenge the products of combustion from the most recent firing, some of that natural gas would escape along with some of the air through the exhaust valve opening, thus contributing unburned hydrocarbon to the atmosphere. This is clearly unacceptable, and the present invention provides a way of avoiding it.

The basic concept is to inject the scavenging air (which is also the combustion air for the next firing) at one location, and then use a timed port injection for the natural gas at a different location, in such a way that the injection of the natural gas is closely controlled in terms of the amount of gas injected and the timing of that injection.

As previously indicated, injection must occur near the bottom dead centre position of the piston travel, in order to allow the injection of low pressure natural gas. Furthermore, it must be completed in a very short space of time before the piston rises to close the natural gas inlet. A special fast-acting valve is used. After the gas has been compressed and its temperature raised by compression, a small amount of diesel fuel is injected at high pressure to compression-ignite the fuel/air mixture and allow the power stroke to commence. The diesel fuel injector must be sized correctly to allow adequate control of diesel pilot injection over the operating range of the engine. The control of the natural gas fuel/air ratio and the diesel pilot quantity is carried out using a computer, over the various load/speed ratios of the engine.

Figure 1:
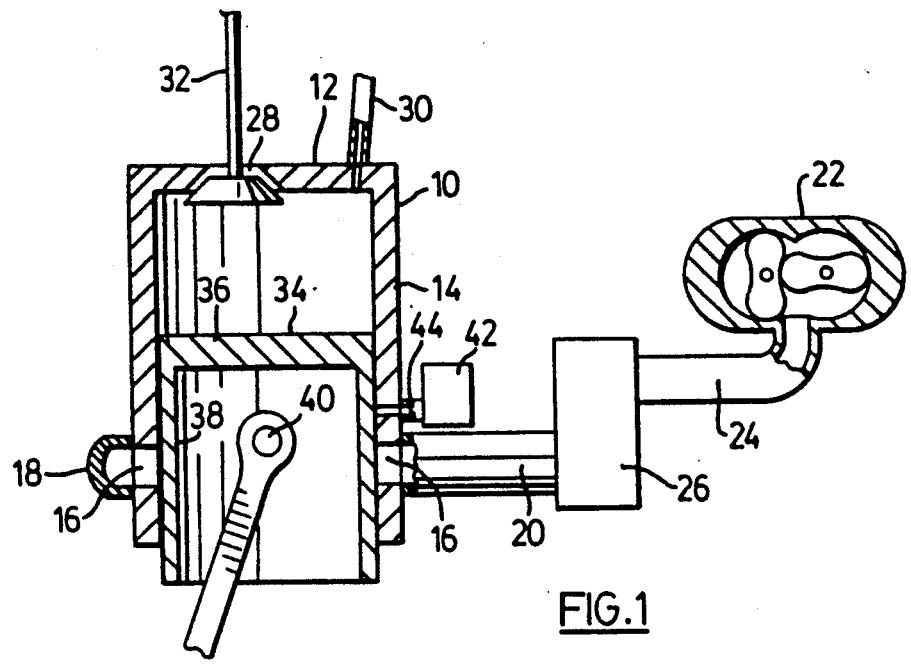

Referring to the FIG. 1, a cylinder 10 is seen to include a top wall 12 and a cylindrical side wall 14. Near the bottom of the cylindrical side wall 14 are a series of ports 16 located at spaced intervals around the side wall 14. All of the ports 16 are in communication with a manifold 18 which receives air under pressure along a conduit 20 from a roots blower 22 possibly with additional means of air pressurization (such as turbo charging). The blower 22 forces air along a conduit 24 which delivers the air to an intercooler shown schematically at 26, from which the cooled air travels along conduit 20 to the manifold 18.

The top wall 12 includes a valve opening 28 and a diesel injection tube 30. An exhaust valve 32 is adapted to close the opening 28.

Within the cylinder is a piston 34 having a top wall 36 and a cylindrical side wall 38. The piston 34 also has a wrist pin 40 in accordance with the customary construction.

As the piston 34 descends under the power stroke, it eventually reaches a position (lower than the position shown) where the ports 16 begin to be uncovered by the piston. This allows pressurized air in the manifold 18 to be blown into the chamber above the piston 34. At this point in time the exhaust valve 32 is open, and the incoming air scavenges the products of combustion from the previous firing out through the aperture 28. During this entry of scavenging air (which also contains the oxygen for the next combustion), a gas valve injector 42 injects a controlled quantity of natural gas through the conduit 44 and into the chamber defined by the cylinder 10. The conduit is located above the ports 16. Nautral gas injection preferably begins after the piston reaches bottom dead center, and must be completed before the rising piston closes the conduit 44.

Figure 2:
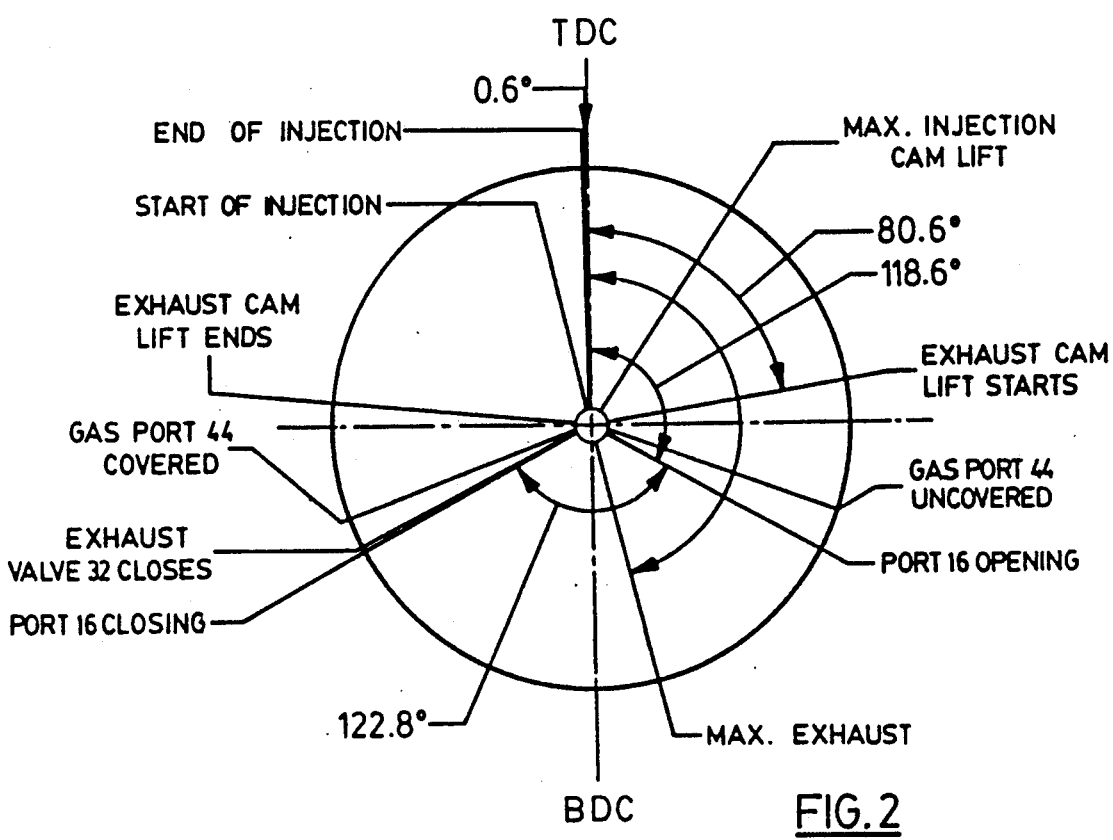

Electronic control of the natural gas injection and diesel pilot injection is a critical element of the present invention. Referring to FIG. 2, the gas conduit 44 is uncovered prior to ports 16 being uncovered. Scavenging takes place during the time that the ports 16 are uncovered and the opening 28 is open. As mentioned above, gas introduction through the injector 42 and the conduit 44 has to be sufficiently early to be completed prior to the point where the ascending piston 36 covers the conduit 44. In accordance with this invention, the end of gas injection occurs later than the point where the piston 36 closes the ports 16. Scavenging is completed while gas injection is still taking place.

It is important to understand why the natural gas injection begins as late as possible, preferably after BDC is reached, and can continue after the air entry has stopped. This provision ensures that a large portion of the combustion air will have filled the cylinder (and scavenged out the remaining combustion gases) before the entry of natural gas, so as to minimize the escape of the new (unburned) natural gas through the exhaust valve. Prior art developments are such that the natural gas is injected only over the bottom dead centre region. The Foster patent, for example, is such that the natural gas does not begin to enter until the air ports have opened. Likewise, the gas delivery stops before the air ports are closed. This leads to the disadvantage of continuing to inject air after the natural gas injection has ceased, thus making it more likely that a portion of the natural gas will be lost out through the exhaust port along with the combustion products from the previous stroke. Essentially, the present invention, by providing for electronic control of the timing of natural gas injection, and by permitting that injection to continue on after the admission of pressurized air has ceased, ensures that any portion of the "combustible mixture" that is lost out through the exhaust port consists essentially of air with virtually no natural gas content.

During operation, the engine at idle receives only the diesel fuel. As a load is applied, natural gas begins to be injected. As the gas quantity increases due to an increase in load, the initiation of gas injection through the injector 42 and conduit 44 is advanced, while the end or termination of gas injection is unchanged. The various timing parameters just discussed are controlled electronically.

Electronic control of diesel fuel injection is also required, in order to control the beginning of diesel injection and the quantity of diesel oil injected. This control is important for the minimization of emissions and is viewed as a critical component of the overall system.

During tests, it was found that, at high load factors, the engine would knock if the intake air temperature exceeded certain values depending on the compression ratio employed. It was further found that by decreasing the typical compression ratio for the standard 2-stroke diesel engine, and by providing cooled air long the conduit 20 through the manifold 18 and into the chamber, the engine knock could be eliminated. Since it is important to achieve as high a compression ratio as possible in order to allow effective cold starting on diesel fuel operation, low intake air temperature is needed during dual fuel operation.

It will be understood that, in the drawing, the intercooler or heat exchanger 26 is merely representative of cooling means. It would be possible to provide series-connected cooling devices, such as an after cooler, in order to achieve the required temperature in the manifold 18 (the airbox).

To summarize, the inventive combination set out herein provides, for a 2-stroke engine, a gas valve for the times (i.e., electronically controlled) injection of natural gas at a location above that for the entry of scavenging air, the cooling of the intake air, and, generally speaking, lower compression ratios for the purpose of operation on natural gas with diesel pilot ignition, whereby gas injection begins after BDC and terminates after air injection has ceased.

While one embodiment of this invention has been illustrated in the accompanying drawings and described hereinabove, it will be evident to those skilled in the art that changes and modifications may be made therein without departing from the essence of the invention, as set forth in the appended claims.

The embodiments of the invention in which an exclusive property or privilege is claimed are defined as follows:

1. In a dual fuel, natural gas/diesel two-stroke engine having at least one cylinder, a piston in the cylinder, inlet port means around the cylinder to be uncovered by downward movement of the piston in the cylinder, air means for forcing air through said inlet port means when uncovered, an exhaust port and valve means for opening said exhaust port once each cycle to exhaust combustion gases from said cylinder, diesel injection means to inject diesel fuel into the cylinder once each cycle, and gas injection means for injecting natural gas into the cylinder once each cycle, the improvement according to which the gas injection means includes a delivery conduit for natural gas, which conduit opens into the cylinder at a location above said inlet port means, whereby the piston when descending completely uncovers said conduit before beginning to uncover said inlet port means.

2. A duel fuel, natural gas/diesel two stroke engine comprising:
   at least one cylinder,
   a piston in the cylinder,
   inlet port means around the cylinder to be uncovered by downward movement of the piston in the cylinder,
   air means for forcing air through said inlet port means when uncovered,
   an exhaust port and valve means for opening said exhaust port once each cycle to exhaust combustion gases from said cylinder,
   diesel injection means to inject diesel fuel into the cylinder once each cycle,
   and gas injection means for injecting natural gas into the cylinder once each cycle, said gas injection means including a delivery conduit for natural gas, which conduit opens into the cylinder at a location above said inlet port means, whereby the piston when descending completely uncovers said conduit before beginning to uncover said inlet port means.

3. The invention claimed in claim 1, in which said gas injection means includes electronic control means arranged to initiate gas injection early enough that the injection begins at or just after bottom dead center, and is completed
   a) before said piston covers the conduit on the upstroke, but
   b) after the piston covers the inlet port means on the upstroke.

4. The invention claimed in claim 2, in which said gas injection means includes electronic control means arranged to initiate gas injection early enough that the injection begins at or just after bottom dead center, and is completed
   a) before said piston covers the conduit on the upstroke, but
   b) after the piston covers the inlet port means on the upstroke.

5. The invention claimed in claim 3, in which said engine further has cooling means for cooling air prior to its injection into the cylinder.

6. A method of operating a dual fuel, natural gas/diesel two stroke engine, the engine comprising:
   at least one cylinder,
   a piston in the cylinder,
   inlet port means around the cylinder positioned to be uncovered by downward movement of the piston in the cylinder,
   air means for forcing air through said inlet port means when uncovered,
   an exhaust port and valve means for opening said exhaust port once each cycle to exhaust combustion gases from said cylinder,
   diesel injection means to inject diesel fuel into the cylinder once each cycle,
   and gas injection means for injecting natural gas into the cylinder once each cycle, said gas injection means including a delivery conduit for natural gas, which conduit opens into the cylinder at a location above said inlet port means, whereby the piston when descending completely uncovers said conduit before beginning to uncover said inlet port means; said method comprising the steps:
   a) as the piston approaches top dead center, injecting diesel fuel into the cylinder to initiate combustion of an ignitable gaseous mixture previously placed in the cylinder,
   b) as the piston descends on the power stroke, beginning the opening of the exhaust port and initiating exhaust prior to the point where the descending piston uncovers the said conduit,
   c) uncovering the conduit due to the further descent of the piston,
   d) after the descending piston has uncovered said inlet port means, forcing air into the cylinder,
   e) after the descending piston has passed bottom dead centre initiating injection of natural gas into the cylinder, f) after the ascending piston covers inlet port means, ceasing the forcing of air into the cylinder, g) closing the exhaust port, as the piston closes the inlet port means, h) halting the injection of natural gas before the ascending piston covers said conduit, but after the piston has closed said inlet port means, i) closing the said conduit after halting the injection of natural gas, and retracing steps a) through i).

7. The method claimed in claim 6, in which scavenging of combustion products through the exhaust port is completed prior to the end of natural gas injection.

8. The method claimed in claim 6, in which, as load on the engine increases, the initiation of natural gas injection is advanced, while the termination of the natural gas injection remains substantially unchanged.

9. The method claimed in claim 7, in which, as load on the engine increases, the initiation of natural gas injection is advanced, while the termination of natural gas injection remains substantially unchanged.

10. The invention claimed in claim 1, in which the air means includes further means for cooling the air passing into the cylinder.

11. The invention claimed in claim 2, in which the air means includes further means for cooling the air passing into the cylinder.

12. The method claimed in claim 6, in which step d) includes cooling the air being forced into the cylinder.

* * * * *